United States Patent [19]
Ronka

[11] 3,872,375
[45] Mar. 18, 1975

[54] AIRBORNE ELECTROMAGNETIC PROSPECTING METHOD AND APPARATUS

[75] Inventor: Vaino Ronka, Burnaby, British Columbia, Canada

[73] Assignee: Hudson Bay Mining and Smelting Co., Limited, Toronto, Ontario, Canada

[22] Filed: Nov. 12, 1973

[21] Appl. No.: 414,923

[52] U.S. Cl. .......................................... 324/4, 324/6
[51] Int. Cl. .............................................. G01v 3/16
[58] Field of Search .............................. 324/3, 4, 6

[56] References Cited
UNITED STATES PATENTS

| | | | |
|---|---|---|---|
| 2,955,250 | 10/1960 | Shaw et al. | 324/4 |
| 3,014,176 | 12/1961 | McLaughlin et al. | 324/4 |
| 3,042,857 | 7/1962 | Ronka | 324/4 |
| 3,108,220 | 10/1963 | Ruddock | 324/4 X |
| 3,396,334 | 8/1968 | Hearn | 324/4 X |

*Primary Examiner*—Gerard R. Strecker
*Attorney, Agent, or Firm*—Ridout & Maybee

[57] ABSTRACT

In a method of electromagnetic prospecting in which a transmitting coil and a receiving coil are moved along different parallel paths across a terrain, the coils are maintained in substantial coaxial alignment and unwanted changes in the primary field at the receiving coil, due to small angular displacements of the coils, are compensated by maintaining a fixed distance between the receiving coil and a point on the original common axis between the coils at a predetermined distance from the transmitting coil.

10 Claims, 7 Drawing Figures

AIRBORNE ELECTROMAGNETIC PROSPECTING METHOD AND APPARATUS

This invention relates to a method and apparatus for geophysical prospecting using electromagnetic fields.

In electromagnetic prospecting it is known to transmit an alternating primary electromagnetic field from one point, thus causing a secondary electromagnetic field due to anomalies (for example, conductive ores, water, salt, water beds and other conductive bodies or formations) in the earth, and to sense the resultant field at a second point spaced from the first. Commonly the first point is the centre of a transmitting coil in an aircraft and the second point is the centre of a receiving coil or coils in a bird towed by the aircraft.

For accurate measurements of the variations in the secondary field it is important that the primary field at the receiver should appear constant. However, errors commonly arise due to variations in the field strength at the receiver caused by small misalignments of the transmitting and receiving coils, and, if the coils are normally aligned along a horizontal axis, small variations in the horizontal distance between them.

It is an object of the present invention to provide means for compensating for such unwanted changes in the primary field. This is achieved by arranging the coils so that small changes in coil alignment are accompanied by small changes in coil spacing such that the errors due to the two kinds of change tend to cancel out.

Thus, according to the invention, there is provided a method of electromagnetic prospecting in which the transmitting and receiving coils are coaxially aligned, the axes of the coils being inclined to the direction of travel, and in which unwanted changes in the primary field due to small displacement of the receiving coils from the common axis are compensated by maintaining a fixed distance between the receiving coil and a point on the common axis between the coils located at a predermined distance from the transmitting coil.

In the case of an airborne electromagnetic prospecting apparatus, where the transmitting coil is mounted on an aircraft and the receiving coil is mounted on a bird towed by the aircraft, it is preferred that the bird should travel at a somewhat lower level than the aircraft, and that the tow cable should be of the kind which provides a certain aerodynamic lift such that the cable will extend along a straight line inclined to the paths of travel of the aircraft and the bird. In this case the cable may be connected to a boom extending rearwardly from the aircraft, the boom being readily movable to an inoperative position at which it will not interfere with the landing of the aircraft.

In order that the invention may be readily understood, one electromagnetic prospecting apparatus in accordance with the invention will now be described, by way of example, with reference to the accompanying drawings, in which.

Figure 1:
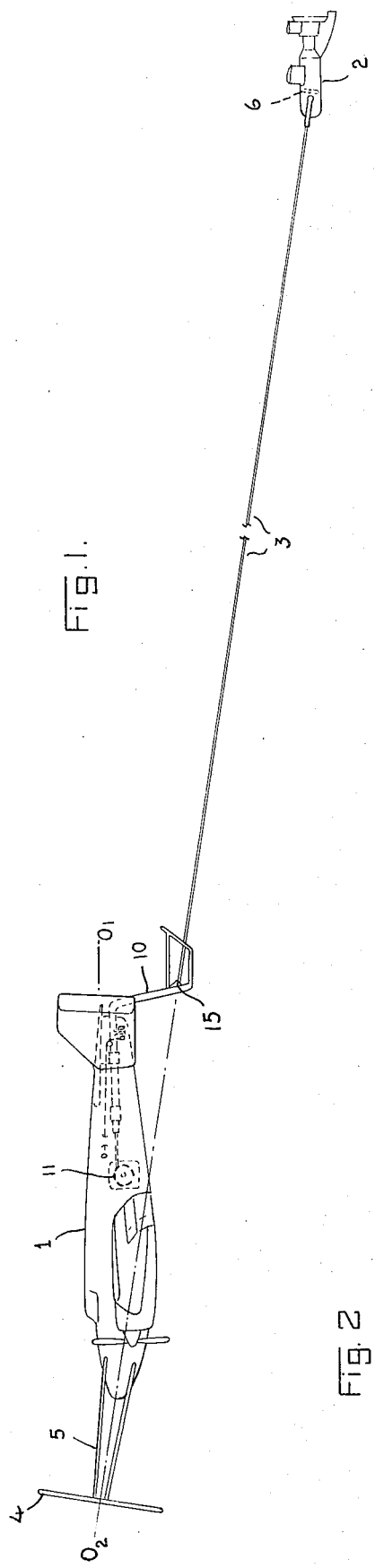
FIG. 1 is a diagrammatic view of the aircraft and a towed bird in flight.

The apparatus illustrated in the drawings is of the generally known type comprising first and second transport bodies each having a longitudinal axis defining a forward direction of travel, electromagnetic transmitting means comprising a transmitting coil supported by the first body for setting up a primary electromagnetic field that induces a secondary electromagnetic field due to anomalies in the earth, and electromagnetic receiving means comprising a receiving coil supported by the second body for sensing a first component of the resultant electromagnetic field. An apparatus of this general type is described in my Canadian Pat. No. 703,767, dated Feb. 16, 1965, and entitled "Electromagnetic Prospecting Method and Apparatus."

Figure 2:
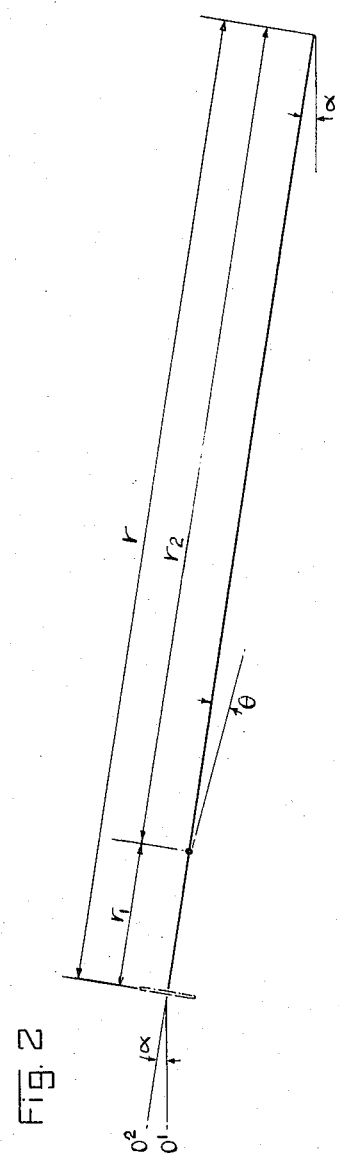
FIG. 2 is a diagram illustrating variations in spacial relationships.

In FIG. 1 an aircraft 1 (first transport body) is shown towing a bird 2 (second transport body) by means of a tow cable 3. The aircraft and bird are travelling along horizontal paths over a terrain which is being examined for ore deposits, the bird 2 travelling at a somewhat lower level than the aircraft 1. The tow cable 3 is of the known kind which provides a certain aerodynamic lift during flight so that it will extend along a substantially straight line between the aircraft and the bird, as shown. Within the aircraft 1 an alternating current generator (not shown) operating at, say, one thousand cycles per second, energizes a transmitting coil 4. The transmitting coil 4 is mounted at the forward end of a boom 5 extending forwardly from the aircraft 1; the boom 5 is inclined upwardly so that the axis $O_2$ of the coil intersects the longitudinal horizontal axis $O_1$ of the aircraft 1 at a small predetermined angle $\alpha$ (see FIG. 2). As previously mentioned, the transmitting coil 1 generates a primary electromagnetic field that causes a secondary electromagnetic field due to conductive anomalies in the earth, the resultant field being sensed by the receiving apparatus mounted in the bird 2.

Figure 6:
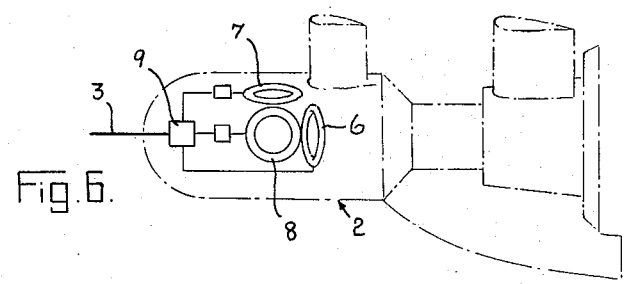
FIG. 6 is a diagrammatic view of a bird containing a preferred receiving apparatus.

The receiving apparatus, which is shown in FIG. 6, is mounted in the bird 2 and comprises a receiving coil 6 supplemented by receiving coils 7 and 8 which sense the field components at right angles to the axis of the coil 6. One of the coils, for example the coil 6, is preferably oriented to pick up the strongest component of the primary field, and thus, often, the strongest component of the secondary field also. The signals from the coils 6, 7 and 8 are transmitted to the measuring apparatus mounted in the aircraft, for further processing. As illustrated diagrammatically in FIG. 6, the signals from the coils 7 and 8 are fed through squaring circuits 26 to a common adding circuit 9 together with the signal from coil 6. The purpose of this arrangement as explained in the patent mentioned above, is to measure the total field without undue errors due to angular rotation of the receiving coil system. In practice this processing is done in a receiving console in the aircraft itself.

The receiving apparatus is generally similar to the receiving apparatus described in my earlier Canadian Pat. No. 703,767, but differs in one important respect; the axis of the receiving coil 6 is inclined to the longitudinal axis of the bird 2, which defines the direction of forward travel of the bird, at the said predetermined angle $\alpha$ and is positioned so that during normal horizontal flight the coil 6 is coaxial with the transmitting coil 4.

Extending rearwardly from the aircraft 1 is a boom 10. The boom is in the form of a hollow crank through which the tow cable 3 passes, the tow cable 3 being paid out from a winch 11 mounted in the aircraft. The boom comprises an axle portion 12 which is journalled in a bearing 13 at the rear of the aircraft body, and a radial crank arm 14, at the end of which is provided a nesting form for stowing the bird 2. The tow cable 3, which passes through the hollow boom 10, emerges from the crank arm at a nozzle 15, which thus provides a point of attachment or connection for the tow cable 3, that is to say a point through which the tow cable must pass and which is spaced from the axis $O_1$. In normal flight the boom is in its operative, lower position as shown in FIG. 1, the point of attachment or nozzle 15 lying at a lower level than the axis $O_1$ of the aircraft, and lying on the common axis $O_2$ of the coils 4 and 6. The aerodynamic characteristics of the tow cable 3 are such that it does not assume a catenary shape but rather lies along a substantially straight line coincident with the axis $O_2$)

Figure 3:
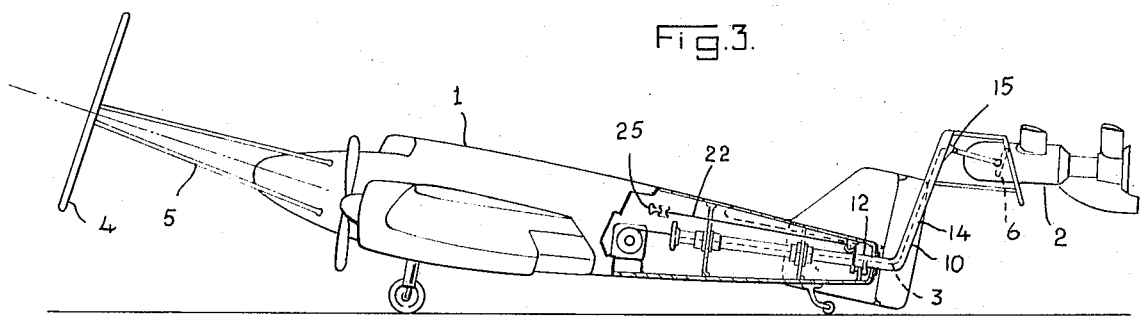
FIG. 3 illustrates the aircraft and bird when on the ground.
Figure 4:
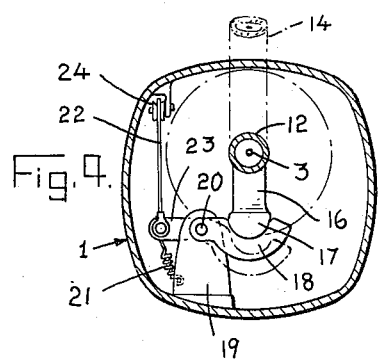
FIG. 4 is an enlarged cross-sectional view on line 4–4 in FIG. 3.
Figure 5:
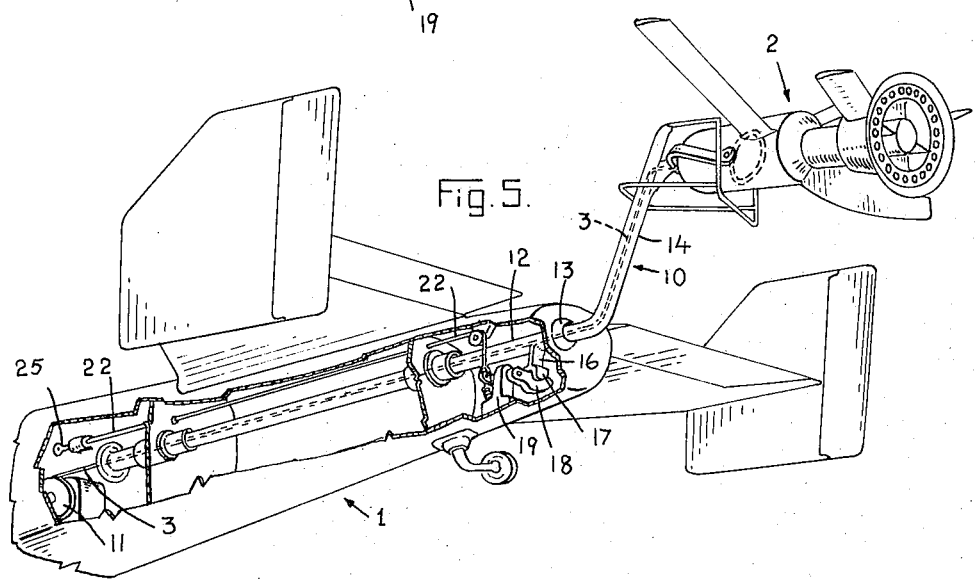
FIG. 5 is a fragmentary perspective view of the rear portion of the aircraft and the boom mechanism.

In order that the boom 10 should not interfere with landing of the aircraft it is movable to the inoperative, raised position represented in FIGS. 3, 4 and 5, and is adapted to be latched in that position. For this purpose the boom is provided with a radial arm 16 extending from the axle portion 12, on which radial arm is mounted a shoe 17 adapted to be engaged by a spring-biassed latching member 18. The latching member 18 is pivotally mounted on a support 19 within the body of the aircraft 1, the latching member 18 being pivoted at 20 and being biassed into the latching position by a spring 21. In order to release the latching member 18 so that the boom 10 may fall to its operative position, a cable 22 is connected to an arm 23 on the member 18, the cable 22 passing over a pulley 24 and being operable from a pull rod which is diagrammatically indicated at 25.

In normal flight the transmitting coil 4 and receiving coil 6 are coaxially aligned and separated by the distance $r_1 + r_2$. The present invention provides a method of compensating for changes in the primary field due to small misalignments, that is, relative angular displacements, between the coils. This is achieved by maintaining a fixed distance $r_2$ between the receiving coil 6 and the point 15, which point lies on the common axis of the coils when they are axially aligned; the point 15 lies at a predetermined distance $r_1$ from the transmitting coil.

Figure 2A:
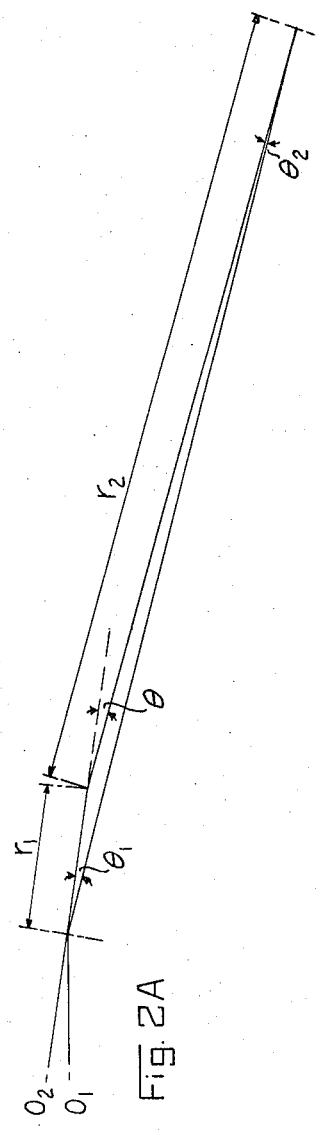
FIG. 2A is a diagram corresponding to FIG. 2 but showing the spacial relationships when the transmitting and receiving coils are slightly misaligned.

If $\theta_1$ is the angular displacement between the coils 4 and 6, $\theta$ is the angular displacement between the axis of coil 6 and the axis $O_2$, and $\theta_2$ is the angular difference $\theta - \theta_1$, then it can be seen from the geometry of FIG. 2A that, for small values of $\theta_1$, by suitably selecting the ratio of the distances $r_1$ and $r_2$ small angular displacements will not substantially affect the primary field strength. Thus:

The field strength is given by:

$$H = \sqrt{1 + 3\cos^2\theta_1} \cdot r^{-3} = 2 \text{ if } \theta_1 = 0 \text{ and } r = 1$$

The distance between the coils is given by $$r = r_1 \cos\theta_1 + r_2 \cos\theta_2$$

Using approximations tolerable with very small values of $\theta_1$, we obtain $$dH/d\theta = -1.5\theta$$

and $$dr/d\theta = -r_1\theta$$

Now, because the nominal value of $h$ is 2 and the shortening of $r$ has the effect with its third power, we are looking for $dr/d\theta = -1/6 \, (dH/d\theta = -1/6 \times 1.5\,\theta = -0.25\,\theta$ That obviously indicates $r_1 = 0.25$. In practice good results can be obtained with $r_1$ from 0.3 to 0.15, or $r_2 = 0.7$ to 0.85 of the total length $r_1 + r_2 = 1$.

What I claim as my invention is:

1. The method of electromagnetic prospecting which comprises:

mounting a transmitting coil on a first transport body;

mounting a receiving coil on a second transport body in coaxial alignment with the transmitting coil;

moving the first and second transport bodies along different, substantially parallel, horizontal paths at an angle to the common axis of the transmitting and receiving coils, while maintaining substantially coaxial alignment of said coils;

transmitting from the transmitting coil a primary alternating electromagnetic field thus causing a secondary electromagnetic field due to anomalies in the earth;

sensing the resultant field at the receiving coils, and compensating for unwanted changes in the primary field due to small misalignments of said transmitting and receiving coils by maintaining a fixed distance between the receiving coil and a point on the common axis between the coils at a predetermined distance from the transmitting coil.

2. The method claimed in claim 1, wherein the path of the first transport body lies vertically above the path of the second transport body.

3. The method claimed in claim 2, wherein second and third components of the resultant field are sensed by second and third receiving coils mounted on the second transport body, the three receiving coils having mutually perpendicular axes.

4. Electromagnetic prospecting apparatus comprising first and second transport bodies each having a longitudinal axis defining a forward direction of travel, said transport bodies being connected by a tow cable, electromagnetic transmitting means comprising a transmitting coil supported by the first body for setting up a primary electromagnetic field that induces a secondary electromagnetic field due to anomalies in the earth, said transmitting coil having an axis which is inclined to said longitudinal axis of the first body at a predetermined angle, electromagnetic receiving means comprising a receiving coil supported by the second body for sensing a first component of the resultant electromagnetic field, said receiving coil having an axis which is inclined to the longitudinal axis of the second body at said predetermined angle, means for maintaining substantial coaxial alignment of the transmitting and receiving coils during forward travel of the bodies, and means for maintaining a fixed distance between the receiving coil and a point on the common axis of the coils at a predetermined distance behind the transmitting coil, whereby to compensate for unwanted changes in the resultant field due to small misalignments of said coils.

5. Electromagnetic prospecting apparatus according to claim 4, wherein the means for maintaining said fixed distance comprises a boom extending rearwardly from the first body, the boom providing a point of attachment for the tow cable, said point of attachment lying on said common axis of the coils.

6. Electromagnetic prospecting apparatus according to claim 5, wherein the boom comprises a crank having an operative position in which said point of attachment is located below the longitudinal axis of the first transport body and an inoperative position in which the point of attachment is located above the longitudinal axis of the first transport body.

7. Electromagnetic prospecting apparatus according to claim 6, including releasable latch means mounted in the first transport body for retaining the boom in the inoperative position.

8. Electromagnetic prospecting apparatus according to claim 7, wherein the transmitting coil is mounted on a second boom extending forwardly from the first body.

9. Electromagnetic prospecting apparatus according to claim 4, wherein the receiving means comprises two further receiving coils whose axes are perpendicular to one another and to the axis of the first said receiving coil.

10. The method claimed in claim 1, wherein the distance $r_1$ from the transmitting coil to said point and the distance $r_2$ from said point to the centre of the receiving coils, are so related that the equation:

$$dH/d\theta_1 = 6 \times dr/d\theta_1$$

where H is the primary field strength at the receiving coil, $\theta_1$ is the relative angular misalignment between the coils, and r is the distance between the coils.

* * * * *